Oct. 11, 1960 R. H. NORMAN 2,956,182

BINARY HALF ADDER CIRCUIT

Filed Feb. 2, 1959

INVENTOR
ROBERT H. NORMAN
BY Henry Huff
ATTORNEY 2,956,182
Patented Oct. 11, 1960

2,956,182

BINARY HALF ADDER CIRCUIT

Robert H. Norman, Glen Oaks, N.Y., assignor to Sperry Rand Corporation, Great Neck, N.Y., a corporation of Delaware Filed Feb. 2, 1959, Ser. No. 790,593
3 Claims. (Cl. 307—88.5)

This invention relates to circuits for use in binary digital computers, and more particularly relates to a half adder circuit for deriving the sum term resulting from the addition of two binary characters.

A half adder is a circuit having two input and two output terminals and which delivers at the respective output terminals signals indicative of the sum and carry terms resulting from the addition of two binary characters which are applied to the respective input terminals. The output signals resulting from the binary addition process are related to the input binary characters according to the following truth table:

| Addend *a* | Augend *b* | Sum S | Carry C |
|---|---|---|---|
| 0 | 0 | 0 | 0 |
| 0 | 1 | 1 | 0 |
| 1 | 0 | 1 | 0 |
| 1 | 1 | 0 | 1 |

The binary addition process may be represented in Boolean algebra, a branch of mathematics commonly employed to express mathematical relationships in a binary number system, by the expressions $$S=a'b+ab' \quad (1)$$

and $$C=ab \quad (2)$$

wherein S represents the sum term, and C represents the carry term resulting from the addition of the two binary characters *a* and *b*. In the notation used herein the primed symbols represent the Not of the unprimed symbols. In words, the above equations state that the signal representing the sum output of a half adder circuit is a one if the binary character *a* is not a one and the binary character *b* is a one, or if the binary character *a* is a one and the binary character *b* is not a one.

The carry term C is a one only if the binary characters *a* and *b* are both ones. By operating on Equation 1 in accordance with the principles of Boolean algebra the expression may be rewritten as $$S'=ab+a'b' \quad (3)$$

which expresses the relationship that the sum of *a* and *b* is not a one if *a* and *b* are ones, or if *a* is not a one and *b* is not a one.

In this discussion a binary one will be represented by the presence of a negative pulse in a binary digit position and a binary zero will be represented by the absence of a pulse in a digit position.

The embodiments of the invention discussed herein will be shown in circuits mechanized in accordance with Direct Coupled Transistor Logic, and in accordance with Resistance Coupled Transistor Logic. In these embodiments a transistor is in either the on or the off state. In the off state a transistor is substantially completely cut-off, while in the on state a transistor is operating in the region of saturation. The voltage at the collector of an off transistor is high enough to cause saturation at the base of a transistor directly coupled thereto. The collector voltage of an on transistor is low enough to hold a transistor coupled directly thereto in the off condition. Operation of the collectors and bases of the transistors in the same voltage region allows the direct coupling between the respective electrodes of the transistors.

Resistance coupled transistor logic circuits are similar to the direct coupled circuits except that the isolation provided by resistance coupling between transistors allows more than one collector to be tied to the base of a transistor.

In certain known types of binary adding circuits employed in the past it has been the practice to drive the base of one transistor from the output signal appearing across a series gate comprised of three or more series connected transistors which are connected between a source of potential and ground. This arrangement has the disadvantage that in actual practice a conducting transistor presents a finite impedance, and when three or more series connected transistors are conducting, the total impedance across the series connected transistors may be significant, and instead of the voltage across the series gate being at ground potential, a significant voltage drop is actually present. This results in an erroneous signal appearing at the base of the one transistor which is coupled to the series gate, and will cause that transistor to conduct rather than to be cut off. This results in erroneous and unreliable operation in a circuit constructed in the manner just described.

It is therefore an object of this invention to provide a novel circuit which produces a signal which is indicative of the sum of two binary characters.

A further object of this invention is to provide a half-adder circuit which reliably produces the sum and carry terms resulting from the addition of two binary characters.

It is another object of this invention to provide a simple and economical circuit for deriving a signal representing the sum term resulting from the addition of two binary digits.

Another object of this invention is to provide a simple and reliable circuit employing relatively few circuit components for deriving a signal which is indicative of the sum of two binary digits, and which also provides a term representing the carry term resulting from the addition of said two binary numbers.

Other objects and a fuller understanding of the invention may be had by referring to the following description and claims, taken in conjunction with the accompanying drawings wherein:

Figure 1:
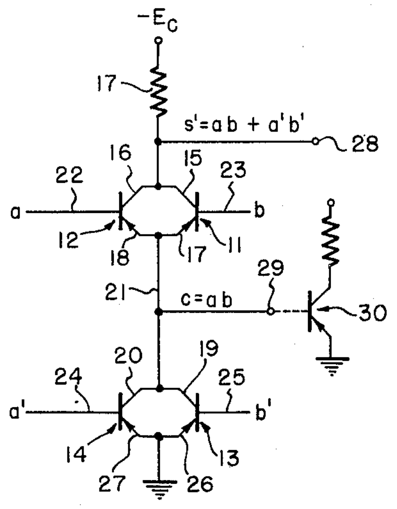
Fig. 1 is an embodiment of the present invention which is adapted for use in a circuit mechanized according to Direct Coupled Transistor Logic.

Fig. 1 is a schematic diagram of a transistorized embodiment of the present invention which employs a plurality of three-terminal PNP type transistors. The circuit of Fig. 1 is a half adder comprised of two pairs of parallel coupled transistors 11, 12 and 13, 14. Collectors 15 and 16 of transistors 11 and 12 are coupled through resistor 17 to a source of negative potential $-E_c$. The parallel connected emitters 17 and 18 of transistors 11 and 12 and the parallel connected collectors 19 and 20 of transistors 13 and 14 are directly connected by lead 21. Signals representing the binary characters to be added, $a$ and $b$, are coupled respectively to bases 22 and 23 of transistors 12 and 11. A signal representing the Not of $a$ is coupled to base 24 of transistor 14 and a signal representing the Not of $b$ is coupled to base 25 of transistor 13. Emitters 26 and 27 of transistors 13 and 14 are parallel coupled to ground. A first output terminal 28 is coupled to parallel connected collectors 15 and 16, and a second output terminal 29 is coupled to the lead 21.

In explaining the operation of the half adder of Fig. 1, it will be assumed, for purposes of illustration, that the binary character $a$ is a one, represented by a negative pulse, and that the binary character $b$ is a zero, represented by the absence of a negative pulse. $a'$ will therefore be a binary zero and $b'$ will be a binary one. By referring to the above truth table it will be seen that the addition of the binary characters of this example should produce a sum signal representing a binary one and a carry signal representing the binary zero.

In accordance with the illustration in Fig. 1, negative pulses will be applied to base 22 and base 25 of transistors 12 and 13, respectively. Bases 23 and 24 will be substantially at ground potential since binary zeros are coupled to these bases. Negative pulses applied simultaneously to bases 22 and 25 will cause respective transistors 12 and 13 to conduct since a low impedance path is provided from the ground, through transistor 13, lead 21, transistor 12, and resistor 17, to negative potential source $-E_c$. The output terminal 28 is therefore substantially at ground potential. This represents a binary zero, and in accordance with Equation 3 is the Not of the sum of $a$ and $b$. The potential at output terminal 29 will also be substantially at ground since transistor 13 is conducting. This represents a binary zero and is the carry term resulting from the addition of binary characters $a$ and $b$.

It is seen that the sum term at output terminal 28 is the Not of the true sum of $a$ and $b$. The true sum may be derived by merely inverting the signal appearing at output 28 by means of a common emitter transistor stage, for example. Some applications of the half adder circuit, some full adders for example, require that both the sum and the Not of the sum be available as output signals. Signals representing both these terms may readily be obtained from the circuit of Fig. 1 by merely coupling an inverting stage in parallel with output terminal 28.

As a further example of the operation of the half adder of Fig. 1 assume that the binary characters $a$ and $b$ are both ones. Negative pulses representing binary ones will be coupled to bases 22 and 23 of transistors 12 and 11 and no pulses, representing $a'$ and $b'$, the Nots of binary ones, will be coupled to bases 24 and 25 of transistors 14 and 13. Transistors 13 and 14 will not conduct because their respective bases are substantially at ground potential. Because bases 22 and 23 are at a negative potential, transistors 12 and 11 are in a condition to conduct if a conduction path is provided from their parallel connected emitters to ground. In Fig. 1 this path is completed through the base-emitter diode of transistor 30 which comprises the load coupled to terminal 29. Because the load has a relatively high impedance compared to the impedance presented by the conducting transistors 11 and 12 connected in parallel, substantially the entire voltage drop will appear across the load. Therefore the potentials at output terminals 28 and 29 are both negative potentials. These negative potentials at terminals 28 and 29 represent binary ones and in accordance with the equations appearing adjacent those terminals of Fig. 1, represent respectively the Not of the sum, and the carry. Reference to the truth table above will verify that these signals are correct for the example assumed wherein $a$ and $b$ are both ones.

Figure 2:
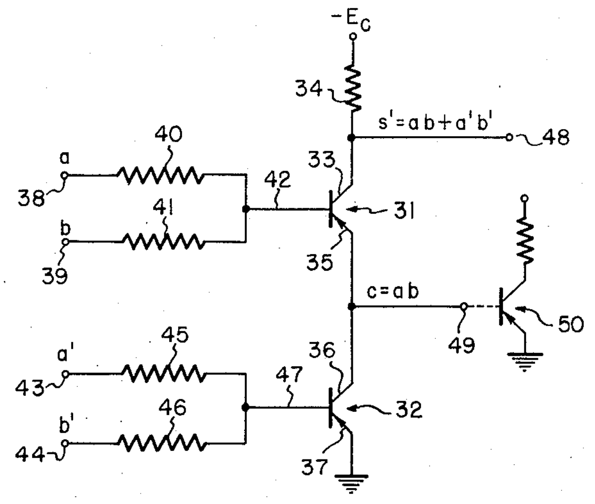
Fig. 2 is an equivalent embodiment of the present invention adapted for use in a circuit mechanized according to Resistor Coupled Transistor Logic.

The half adder illustrated in Fig. 2 is comprised of two three-terminal PNP type transistors 31 and 32. The collector 33 of transistor 31 is coupled through resistor 34 to a source of negative potential $-E_c$, and the emitter 35 is coupled in series to the collector 36 of transistor 32. The emitter 37 of transistor 32 is connected to ground. Input terminals 38 and 39 are parallel coupled through respective resistors 40 and 41 to base 42 of transistor 31. In a similar manner, input terminals 43 and 44 are parallel coupled through respective resistors 45 and 46 to base 47 of transistor 32. Output terminal 48 is coupled to collector 33 of transistor 31, and output terminal 49 is coupled to the common connection between emitter 35 and collector 36.

As previously stated, the half adder circuit illustrated in Fig. 2 is the resistance coupled equivalent of the direct coupled embodiment illustrated in Fig. 1. For example, in Fig. 2 resistors 40 and 41 would be coupled between base 42 and the collectors of respective transistors which are coupled to input terminals 38 and 39. These resistors provide sufficient isolation between the collectors of the two input transistors to permit both of them to be coupled to the base of a single transistor.

The operation of the half adder circuit of Fig. 2 is substantially the same as the operation of the circuit of Fig. 1, and as an illustrative example, it will be assumed that the binary characters $a$ and $b$ to be added are both ones. Therefore, negative pulses will be coupled to input terminals 38 and 39, and no pulses, the Nots of $a$ and $b$, are coupled to input terminals 43 and 44. Because no pulses are coupled to input terminals 43 and 44, base 47 of transistor 32 will be substantially at ground potential and transistor 32 will be cut off. Simultaneously occurring negative pulses at terminals 38 and 39 will cause base 42 to go negative and place transistor 31 in a condition to conduct. In a manner similar to that previously described, in connection with Fig. 1, a conduction path is provided through the emitter-base diode of transistor 50 (the load circuit), output terminal 49, through transistor 31, through resistor 34 to negative potential source $-E_c$. Because substantially the entire voltage drop appears across the load circuit comprised of the base-emitter diode of transistor 50, the potentials at output terminals 48 and 49 will both be negative potentials. These represent binary ones present at both output terminals, and in accordance with Equations 3 and 2, represent, respectively, the Not of the sum, and the carry resulting from the addition of two binary ones.

Similar analyses of the operation of the circuit of Fig. 2 with other combinations of binary characters will verify that the output at terminal 48 is always the Not of the sum of the characters and that the output at terminal 49 is always the carry.

Considering the overall operation of the two circuits just described it may be considered that the arrangements of the transistors in each circuit comprises a series gating means. It will be seen that, functionally, the same simple circuit which produces a signal indicative of the sum, also produces a carry signal. The phrase "indicative of the sum" is intended to include the true sum or the Not of the sum, since one is merely the inverse of the other, and since the equations expressing the sum and the Not of the sum are directly related in Boolean algebra.

Figure 3:
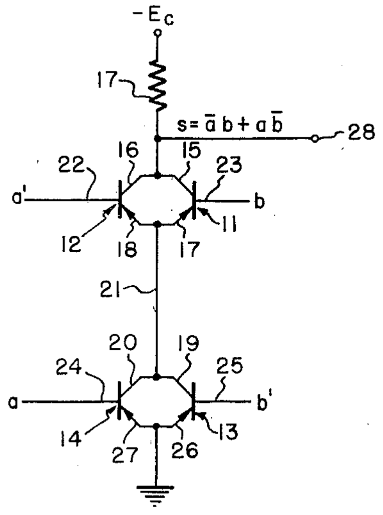
Fig. 3 is an illustration of a variation of the circuit illustrated in Fig. 1.

The circuit of Fig. 3 is a variation of the circuit of Fig. 1 which produces an output signal which is the true sum of two input binary characters, but which does not produce a signal representing the carry. The circuit of Fig. 3 is useful in digital computers wherein the carry is already available from another source. The circuit of Fig. 3 is substantially identical to the circuit of Fig. 1 except that an output terminal for the carry is not provided. In addition, the input signals representing the binary characters to be added, and the Nots of those binary characters, are coupled to different input terminals than were the corresponding signals in Fig. 1. The corresponding components of Figs. 1 and 3 are designated by similar reference characters.

As one example of the operation of the circuit of Fig. 3 it will be assumed that the binary characters *a* and *b* to be added are both binary ones. Therefore, negative pulses are coupled to bases 23 and 24 of transistors 11 and 14 and no pulses, the Nots of the binary characters, are coupled to bases 22 and 25 of transistors 12 and 13. With these inputs to the respective bases, transistors 11 and 14 will conduct, the conduction path being from ground through transistor 14, through transistor 11, through resistor 17 to negative potential source $-E_c$. The potential at output terminal 28 will therefore be substantially at ground. This represents a binary zero, and by referring to the truth table above it will be seen that this corresponds to the sum of two binary ones.

As another example, assume that the binary characters *a* and *b* are zero and one, respectively. Therefore $a'$ is one and $b'$ is zero. With these inputs applied to the correspondingly designated bases of Fig. 3, it will be seen that transistors 11 and 12 will have negative pulses applied at their bases and transistors 13 and 14 will have no pulses applied to their bases. Transistors 13 and 14 cannot therefore conduct and consequently there is no conduction path to ground from the emitters 17 and 18 of transistors 11 and 12. Transistors 11 and 12 will therefore not conduct and the potential at output 28 will be a negative potential. This represents a binary one as the sum at output terminal 28, and corresponds to the truth table above.

Figure 4:
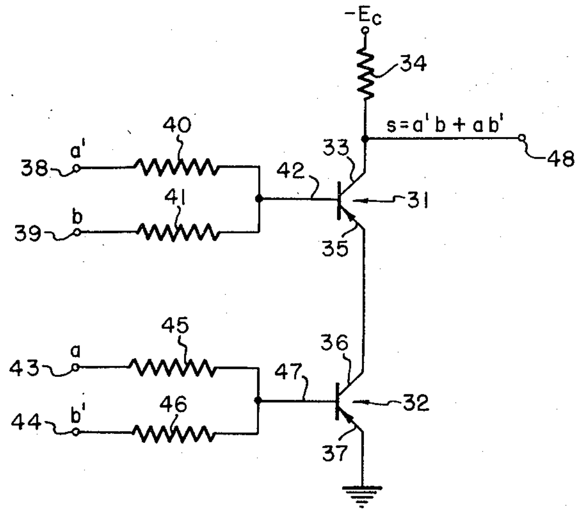
Fig. 4 is an illustration of a variation of the circuit of Fig. 2.

Fig. 4 illustrates a circuit which is a variation of the circuit of Fig. 2 and, like the circuit of Fig. 3, produces an output signal representing the true sum but produces no carry. Fig. 4 is similar to Fig. 2 except for the omission of output terminal 49 and except for the manner in which input signals are coupled to the respective input terminals. Corresponding components of Figs. 2 and 4 are represented by like numerals. As an example of the operation of the circuit of Fig. 4, again assume that the binary characters *a* and *b* to be added are both ones. Negative pulses will therefore be coupled to input terminals 39 and 43, and no pulses, representing the Nots of the respective binary characters, will be coupled to respective input terminals 38 and 44. The negative pulse from input terminal 39 will be coupled through resistor 41 to base 42 of transistor 31. Simultaneously, the negative pulse on input terminal 43 is coupled through resistor 45 to base 47 of transistor 32. Because both bases are at a negative potential transistors 31 and 32 will conduct and the potential at output terminal 48 will be substantially at ground. This represents a binary zero, and is the correct sum of the binary characters *a* and *b* which were assumed to be ones.

Analyzing the operation of the circuit of Fig. 4 with other combinations of binary characters will verify that the output at terminal 48 will always be the sum of the output binary characters.

In the embodiments of this invention constructed substantially as illustrated in Figs. 1 and 2, the circuit components had the following values;

All transistors were type 2N240 manufactured by Philco Corporation.

| | |
|---|---|
| Resistor **17** | 510 ohms. |
| Resistor **34** | 1600 ohms. |
| Resistors **40, 41, 45, 46** | 2700 ohms. |
| Voltage Source $-E_c$ | −1.5 volts. |

It may be seen that the binary addition process is performed by the circuits of this invention by connecting two gating means, each having two input terminals, in series with a source of potential. The gating means operate to provide a low impedance path in the series circuit whenever pulses are simultaneously applied to an input terminal of each. By coupling signals representing the two binary characters to be added, and the Nots of those characters to the four input terminals in prescribed manners, a signal indicative of the sum of the two binary characters may be obtained.

While the invention has been described in its preferred embodiments, it is to be understood that the words which have been used are words of description rather than of limitations and that changes within the purview of the appended claims may be made without departing from the true scope and spirit of the invention in its broader aspects.

What is claimed is:

1. Apparatus for deriving a signal indicative of the sum of two binary characters and for deriving a signal representing the carry term resulting from the binary addition of said two characters wherein a binary one is represented by a pulse and a binary zero is represented by the absence of a pulse, comprising first and second gating means each adapted to be in an open condition to pass a current only if input signals are applied to either or both of first or second of its terminals, means for coupling a source of direct current potential between a third terminal of said first gating means and a fourth terminal of said second gating means, means for coupling a fourth terminal of said first gating means to a third terminal of said second gating means to connect said gating means in series relationship, a first output terminal coupled to the third terminal of said first gating means, a second output terminal coupled to the series connecting means between said two gating means, means connected between said second output terminal and said source for providing a conduction path therebetween having an impedance which is high compared to the impedance of said first gating means when open but having an impedance which is low compared to said second gating means when closed, said second output terminal and said impedance means being in parallel with said second gating means, means for coupling first and second input signals to the first and second terminals, respectively, of said first gating means, said first and second input signals representing said two binary characters to be added, means for coupling third and fourth input signals, respectively, to the first and second terminals of said second gating means, said third and fourth input signals representing the Nots of said binary characters to be added, said four input signals occurring substantially simultaneously thereby to establish a series conduction path through said source and said two series connected gating means if only one of said binary characters is a one and to establish a series conduction path through said source, said first gating means, said second output terminal and said impedance means coupled thereto if both of said binary characters are ones.

2. Apparatus for deriving signals indicative of the sum and carry terms resulting from the binary addition of two binary characters wherein the presence of a pulse in a digit of a number designates a binary one and the absence of a pulse in a digit of a number represents a binary zero, comprising in combination four three-terminal electron conduction devices, the first terminal of each of said devices being a control electrode of the respective device, the corresponding second terminals and the corresponding third terminals of the first and second of said devices and the corresponding second terminals and corresponding third terminals of the third and fourth of said devices being coupled, respectively, in parallel, means for coupling a source of direct current potential between the second terminals of said first and second devices and the third terminal of said third and fourth devices, means providing a series connection between the third terminals of said first and second devices and the second terminals of said third and fourth devices, a first output terminal coupled to the second terminals of said first and second devices, a second output terminal coupled to said series connecting means, means connected between said second output terminal and said source for providing a conduction path therebetween having an impedance which is high compared to the impedance of said parallel coupled first and second devices when either or both of said first or second devices are conducting, said impedance being low relative to the impedance of said parallel coupled third and fourth devices when neither of said third or fourth devices are conducting, said second output terminal and said impedance means being in parallel with said third and fourth devices, means for respectively coupling first and second input signals to the first terminals of said first and second devices, said first and second input signals representing two binary characters to be added, means for respectively coupling third and fourth input signals to the first terminals of said third and fourth devices, said third and fourth input signals representing the Nots of said two binary characters to be added, said four input signals occurring substantially simultaneously thereby to establish a series conduction path through said source and one of said parallel connected first and second devices and one of said parallel connected third and fourth devices if only one of said binary characters is a one and to establish a series conduction path through said source, said parallel connected first and second devices, said second output terminal and said impedance means coupled thereto if both of said binary characters are ones, whereby a signal representing the Not of the sum of said binary characters is present on said first terminal and a signal representing the carry term is present on said second output terminal.

3. A half-adder for deriving a signal indicative of the sum of two binary characters and for deriving a signal representing the carry resulting from the addition of said binary characters wherein the presence of a pulse in a digit of a number designates a binary one and the absence of a pulse in a digit of a number designates a binary zero, comprising first and second three-terminal transistors each having a base, a collector, and an emitter electrode, means for providing a series connection between the emitter of said first transistor and the collector of said second transistor, means for coupling a source of potential between the collector of said first transistor and the emitter of said second transistor, first and second output terminals respectively coupled to the collector and emitter of said first transistor, a load circuit connected to said second output terminal for presenting an impedance which is high compared to the emitter-collector impedance of said first transistor when said first transistor is conducting but is low compared to the emitter-collector impedance of said second transistor when said second transistor is not conducting, first and second input terminals coupled to the base of said first transistor, third and fourth input terminals coupled to the base of said second transistor, first and second input signals respectively coupled to said first and second input terminals and third and fourth input signals respectively coupled to said third and fourth input terminals, said first and second signals representing said two binary characters to be added and said third and fourth input signals representing the Nots of said two binary characters, said four input signals occurring substantially simultaneously thereby to establish a series conduction path through said source and said two series connected transistors if only one of said binary characters is a one and to establish a series conduction path through said source, said first transistor, said second output terminal and said load coupled thereto if both of said binary characters are ones, whereby a signal representing the Not of the sum of said two binary characters is present on said first output terminal and a signal representing the carry term is present on said second output terminal.

References Cited in the file of this patent

UNITED STATES PATENTS

| | | |
|---|---|---|
| 2,603,746 | Burkhart | July 15, 1952 |
| 2,831,987 | Jones | Apr. 22, 1958 |
| 2,885,572 | Felker | May 5, 1959 |
| 2,892,099 | Gray | June 23, 1959 |

OTHER REFERENCES

"Arithmetic Operations in Digital Computers," by Richards, copyright 1955, pages 85–87.

"Directly Coupled Transistor Circuits," by Beter Electronics, June 1955, pages 132–136.